B. A. RAMSEY.
Walking Planter.
No. 108,051. Patented Oct. 4, 1870.
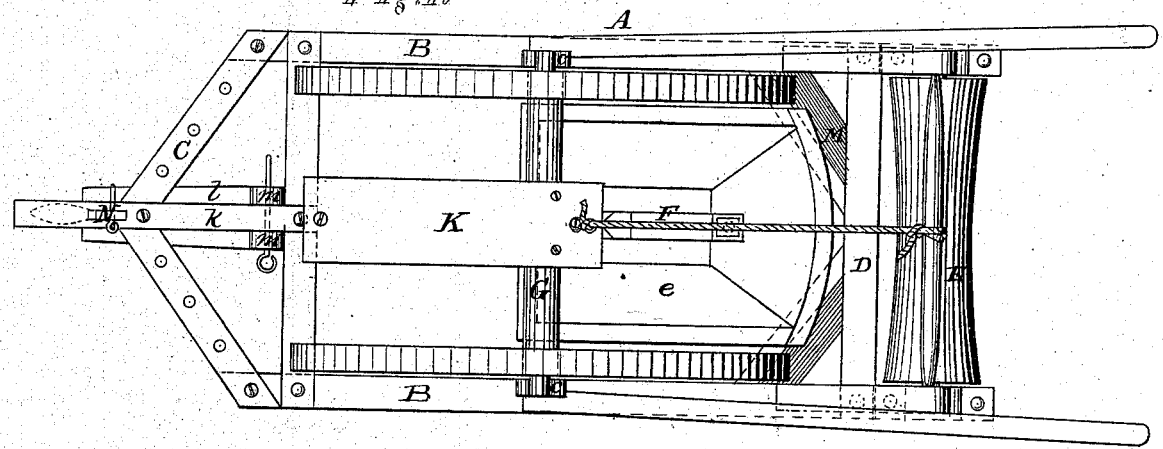
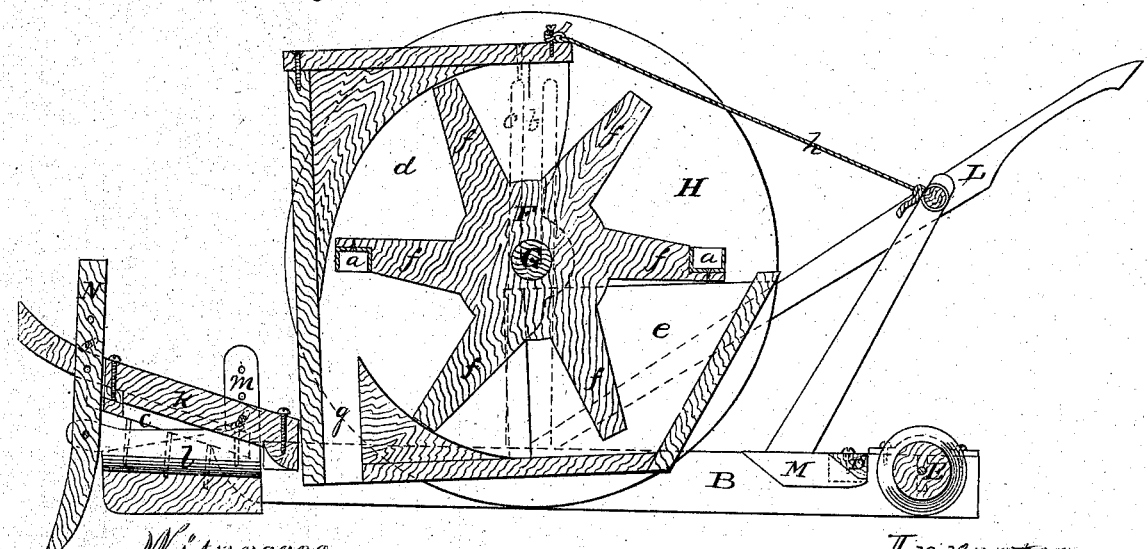

United States Patent Office.

BLACKMAN ASBURY RAMSEY, OF TRENTON, TENNESSEE.

Letters Patent No. 108,051, dated October 4, 1870.

IMPROVEMENT IN SEED-PLANTERS.

The Schedule referred to in these Letters Patent and making part of the same.

*To all whom it may concern:*

Be it known that I, BLACKMAN ASBURY RAMSEY, of Trenton, in the county of Gibson and State of Tennessee, have invented a new and valuable Improvement in Planters; and I do hereby declare that the following is a full, clear, and exact description of the construction and operation of the same, reference being had to the annexed drawing making a part of this specification, and to the letters and figures of reference marked thereon.

Figure 1 of the drawing is a plan view of my invention.

Figure 2 is a longitudinal vertical section of the same.

My invention has relation to means for planting corn and other grain; and

It consists in the construction and novel arrangement of devices designed to vary the quantity of seed deposited, thereby rendering it suitable for large or small grain, to vary the depth of the seed-trench, according to the climate and season, and to vary the distance between the hills, according to the will of the farmer.

The letter A of the drawing designates the frame of my corn-planter, which consists of two runners, B B, connected in front by an angular tooth-bearing bar, C, inclined upwardly and forward, and in rear by the beveled bar D and covering-roller E.

F represents the planting-wheel, having several radial arms, $f\,f$, to the ends of one or more of which are attached the cups or boxes $a$, designed to be supplied in different sizes with the planter to suit the various kinds of grain.

The wheel F is rigidly secured to the shaft G, to the ends of which are fastened the driving-wheels H H. By varying the size of these wheels the distance between the hills may be changed at will.

The shaft G projects beyond each wheel, and each end thereof plays up and down in a vertical slot, $b$, in the supports or uprights $c\,c$, attached to the runners B B.

The wheel F rotates in a box, K, the lower part of which constitutes the seed-reservoir, from which the grain is scooped by the cups on the ends of the radial arms.

The upper and forward part of the box K is curved to suit the strike of the radial arms, and arranged with lateral walls, $d$, to prevent any of the grain from being lost after the cup enters this portion of the box.

At the same time the radial arms are made of sufficient width to prevent the grain from falling back into the seed-reservoir $e$.

The seed is deposited through the opening $g$ at the lower front corner of the box.

The shaft G revolves in journal-seats in the lateral walls of the box K, and the pitch of the latter is regulated by means of a rope, $h$, or other suitable device.

L represents the handles of the corn-planter.

M represents the angular drag which follows the deposited grain and gathers the earth over it.

N represents an adjustable colter, keyed to the center-bar $k$.

Near the lower end of the colter is pivoted the forward end of the wedge-shaped opener or shoe $l$, from the rear end of which rise the perforated arms $m$, on each side of the center-bar $k$, to which they are keyed. This arrangement is designed to vary the relative positions of the shoe and colter to correspond with the depth of drill.

If the planting-wheel has six radial arms and the drive-wheels a circumference of six feet, the use of one cup will place the hills six feet apart; two cups will give a distance of three feet between the hills, and three cups two feet.

What I claim as my invention, and desire to secure by Letters Patent, is—

The combination and arrangement of the adjustable colter N, adjustable shoe $b$, planting-wheel F, case K, trough $c$, angular drag M, and roller E, when constructed substantially as and for the purpose set forth.

In testimony that I claim the above I have hereunto subscribed my name in the presence of two witnesses.

BLACKMAN ASBURY RAMSEY.

Witnesses:
A. S. CURREY,
R. H. BURNS.